No. 883,746. PATENTED APR. 7, 1908.
A. D. ROBBINS.
MEANS FOR MOUNTING A BICYCLE WHEEL WHEREBY IT MAY BE PLACED CONCENTRIC OR ECCENTRIC WITH AXLE.
APPLICATION FILED JULY 19, 1907.

3 SHEETS—SHEET 1.

No. 883,746.  
A. D. ROBBINS.  
PATENTED APR. 7, 1908.
MEANS FOR MOUNTING A BICYCLE WHEEL WHEREBY IT MAY BE PLACED CONCENTRIC OR ECCENTRIC WITH AXLE.
APPLICATION FILED JULY 19, 1907.
3 SHEETS—SHEET 2.
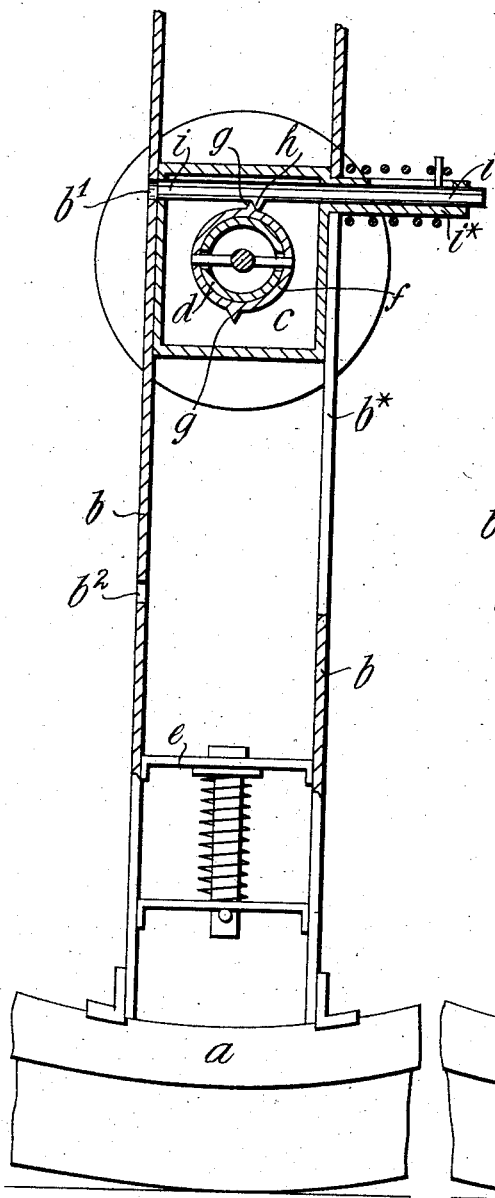
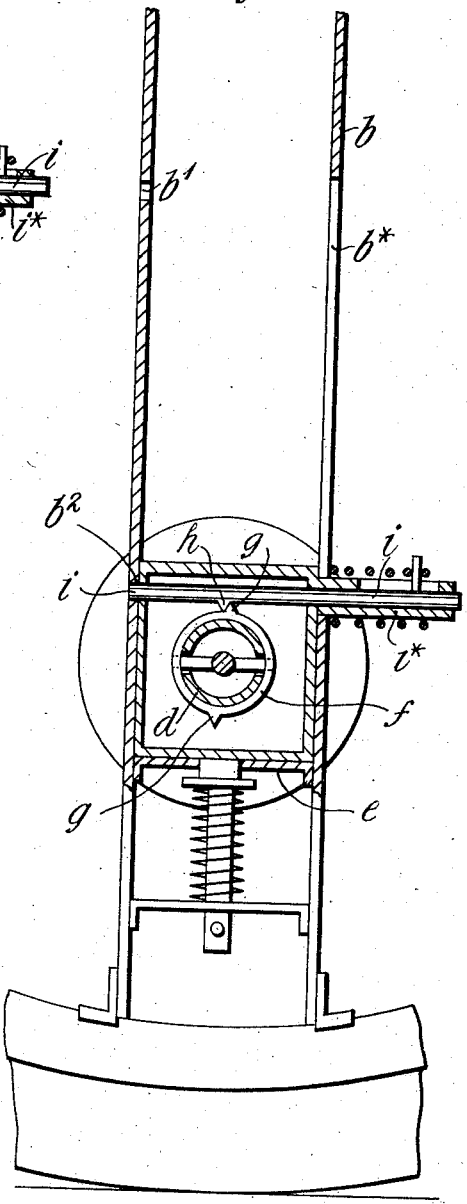

No. 883,746.  
A. D. ROBBINS.  
PATENTED APR. 7, 1908.  
MEANS FOR MOUNTING A BICYCLE WHEEL WHEREBY IT MAY BE PLACED CONCENTRIC OR ECCENTRIC WITH AXLE.  
APPLICATION FILED JULY 19, 1907.

3 SHEETS—SHEET 3.

Witnesses.  
Percy M. Goodwin.  
Rob't Hunter.

Inventor. Arthur Delavan Robbins.  
by His Attorney.

UNITED STATES PATENT OFFICE.

ARTHUR D. ROBBINS, OF LONDON, ENGLAND.

MEANS FOR MOUNTING A BICYCLE-WHEEL WHEREBY IT MAY BE PLACED CONCENTRIC OR ECCENTRIC WITH AXLE.

No. 883,746.

Specification of Letters Patent.

Patented April 7, 1908.

Application filed July 19, 1907. Serial No. 384,607.

*To all whom it may concern:*

Be it known that I, ARTHUR DELORAN ROBBINS, a subject of the King of Great Britain and Ireland, and resident of 20 Torrington Square, London, England, have invented certain new and useful Improvements in Means for Mounting a Bicycle-Wheel Whereby it May be Placed Concentric or Eccentric with Axle, of which the following is a specification.

This invention has for its object to provide a means whereby a bicycle wheel may be changed from a perfectly round moving to an eccentrically moving wheel, to cause a limping or galloping movement, and vice versa, the wheel being changed either way from one position to another without the rider dismounting.

In order that the said invention may be readily understood reference is to be had to the following description and accompanying sheets of drawings which illustrate a practical method of construction and in which:—

Figure 1:
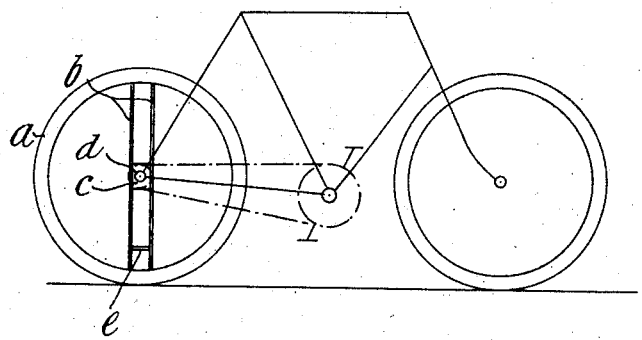
Figure 2:
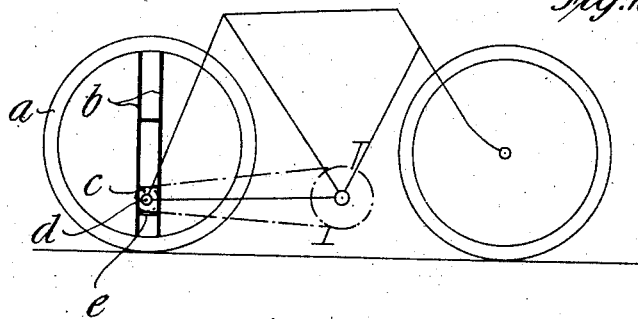
Figure 3:
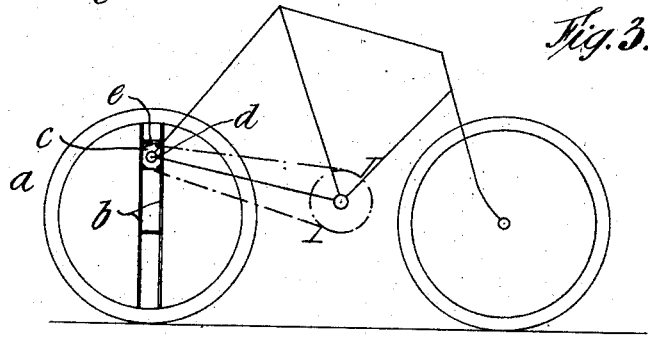

Figures 1 to 3 are diagrammatic views showing the wheel in its normal and in its highest and lowest eccentric positions. Figs. 4 and 5 are vertical detail views illustrating the fall from concentric to eccentric; and, Fig. 6 is a part sectional view of hub or slide box.

Like letters of reference indicate corresponding parts in the several figures.

Figure 6:
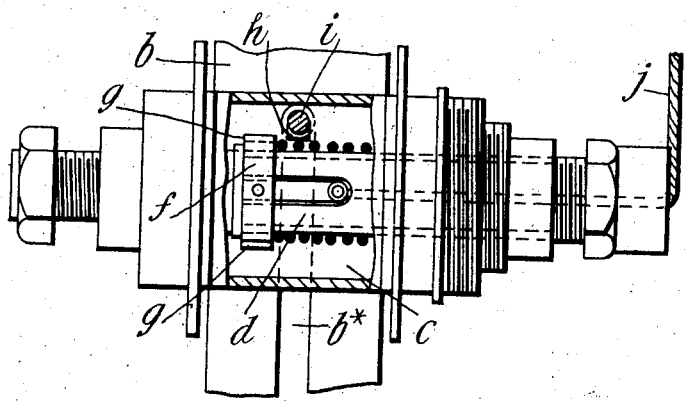

In carrying the said invention into effect, to the ordinary rim of the wheel $a$ two guides $b$, $b$ are attached extending preferably right across the diameter of the wheel and adapted to slide between these guides is arranged a square flanged hub $c$ provided therein and therethrough with a hollow axle $d$—Figs. 4 to 6—upon which can slide the spring controlled set-off piece $f$, the same having arranged thereon a cam or other surfaces $g$ adapted to engage with a projection or the like $h$ on the spring bolt $i$ carried in boss $i^*$ working in slot $b^*$ for the purpose of shifting back said bolt $i$, the arrangement being such that when the set-off is moved to one side by a pull upon the wire $j$ or equivalent device to which it is attached and which passes through the hollow axle $d$, the cam or other face $g$ forces the bolt $i$ back from engagement with the hole $b'$—Fig. 4—permitting the hub $c$ to fall under the weight of the rider directly the slides assume the vertical from concentric to eccentric position—Figs. 1, 2, 4 and 5.

The hub $c$, having reached its eccentric position—Fig. 5—is again locked, the set-off having been released and returned by its spring, the bolt $i$ engaging in the hole $b^2$ under the action of its spring, causing an eccentric movement—Figs. 2 and 3—to the wheel when in motion. Thus a person riding a bicycle with a wheel mounted as above set forth can set the machine by the manipulation of a lever, attached to any suitable part of the frame, from a smooth to limping or galloping movement, said lever being attached to the wire or the like which operates the movable set-off, again the wheel can be returned from the eccentric to the concentric or natural round smooth running wheel in a similar manner. Further the lever may be fixed when desired so that the set-off is kept in close contact with the spring bolt, instead of being returned to its normal position by its spring, consequently the hub is changed from one position to the other without further manipulation of the lever. The hub $c$ when it reaches its eccentric position strikes against the spring-controlled pin carried by bar $e$—Figs. 4 and 5—thereby avoiding a heavy shock, and further it is to be understood that the spokes are attached to the guides and to the rim and not to the flanges of the hub as is usual.

It is of course to be understood that the frame of the bicycle, only diagrammatically illustrated, is of such dimensions as to permit the wheel at its greatest eccentricity passing clear of the axle, or if a frame of the ordinary dimensions is used then the wheel must be of a small diameter to accommodate itself to said frame.

Having now described my invention what I claim as new and desire to secure by Letters Patent of the United States is:—

1. As a means for mounting a bicycle wheel whereby it may be placed concentric or eccentric with the axle thereof, the combination of a circular rim with guides placed across the diameter thereof; with a hub carrying a hollow axle, sliding therebetween, and with a spring bolt for locking and releasing said hub, substantially as herein described and operated in the manner set forth.

2. As a means for mounting a bicycle wheel whereby it may be placed concentric or eccentric with the axle thereof, the combination of transverse guides, sliding hub and spring locking bolt with a spring-controller set off having a cam surface and sliding upon a hollow axle, engaging with and releasing said spring locking bolt substantially as described.

In witness whereof I have affixed my signature in presence of two witnesses.

A. D. ROBBINS.

Witnesses:
    BENJN. THOS. KING,
    ROBT. HUNTER.